(12) United States Patent
Patil et al.

(10) Patent No.: US 7,788,720 B2
(45) Date of Patent: Aug. 31, 2010

(54) TECHNIQUES FOR PROVIDING SECURITY PROTECTION IN WIRELESS NETWORKS BY SWITCHING MODES

(75) Inventors: Jeevan Patil, San Jose, CA (US); Jeremy E. Stieglitz, Menlo Park, CA (US); Shripati Acharya, Fremont, CA (US); Ian Foo, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1142 days.

(21) Appl. No.: 11/435,123

(22) Filed: May 16, 2006

(65) Prior Publication Data

US 2007/0271457 A1  Nov. 22, 2007

(51) Int. Cl.
*G06F 21/00* (2006.01)
*G06F 11/30* (2006.01)
*G06F 15/16* (2006.01)

(52) U.S. Cl. .............................. 726/22; 726/1; 709/224

(58) Field of Classification Search ........................ None
See application file for complete search history.

(56) References Cited

U.S. PATENT DOCUMENTS

| | | | | |
|---|---|---|---|---|
| 6,986,161 B2 * | 1/2006 | Billhartz | ...................... | 726/23 |
| 7,051,367 B1 * | 5/2006 | Krishnaswamy et al. | ...... | 726/22 |
| 7,082,117 B2 * | 7/2006 | Billhartz | ...................... | 370/338 |
| 7,308,713 B1 * | 12/2007 | Jardin et al. | ................... | 726/23 |
| 7,331,061 B1 * | 2/2008 | Ramsey et al. | ................ | 726/23 |
| 7,418,732 B2 * | 8/2008 | Campbell et al. | ............. | 726/23 |
| 7,441,275 B2 * | 10/2008 | McCallam et al. | ............. | 726/25 |
| 7,493,657 B1 * | 2/2009 | Krishnaswamy et al. | ...... | 726/22 |
| 7,516,487 B1 * | 4/2009 | Szeto et al. | .................... | 726/22 |
| 7,526,808 B2 * | 4/2009 | Lynn et al. | ..................... | 726/23 |
| 7,532,895 B2 * | 5/2009 | Hrastar | ..................... | 455/456.1 |
| 7,571,478 B2 * | 8/2009 | Munson et al. | ................ | 726/23 |
| 2004/0153665 A1 * | 8/2004 | Browne | ........................ | 713/201 |
| 2004/0250124 A1 * | 12/2004 | Chesla et al. | ................ | 713/201 |
| 2005/0076121 A1 | 4/2005 | Kortum et al. | | |

OTHER PUBLICATIONS

Braumann, et al.; "White Paper: Honeypots"; Feb. 26, 2002; pp. 1-10.

* cited by examiner

*Primary Examiner*—Christopher A Revak
(74) *Attorney, Agent, or Firm*—Trellis IP Law Group, PC

(57) ABSTRACT

Techniques for security protection of a wireless network are provided. An access point is operated in a first mode. The first mode is a mode of operation that allows access to resources of a network. A security event for a client is detected while operating the access point in the first mode. Then, the access point is changed from the first mode of operation to a second mode of operation. The second mode is a restricted mode of operation that restricts access to resources of the network. Analysis may then be performed to determine if the client is an unauthorized client or valid client.

33 Claims, 4 Drawing Sheets

TECHNIQUES FOR PROVIDING SECURITY PROTECTION IN WIRELESS NETWORKS BY SWITCHING MODES

BACKGROUND OF THE INVENTION

The present invention generally relates to wireless communications and more specifically to techniques for providing security protection for access points in response to a security event.

With the advent of wireless technology and wireless networks, attacks on these networks have become more frequent. The attacks include worm propagation through a network or potential hackers that attempt to log on to an access point and infiltrate a network.

When an unauthorized client is detected, actions are taken to prevent the user from accessing the network. For example, the unauthorized client may be immediately disconnected from the access point and/or the access point may be immediately disconnected from the switch port. This is done to ensure an unauthorized client cannot access the network. This protects the network; however, false positives may occur in which clients are deemed unauthorized, but may in reality be valid clients. In these cases, the valid clients may be prevented from accessing the network, which is undesirable. Also, because the unauthorized client is disconnected from the network, it is hard to determine any information about the client, such as their identity, etc. This information may be valuable in stopping future attacks or catching a user of the unauthorized client.

DETAILED DESCRIPTION OF EMBODIMENTS OF THE INVENTION

Figure 1:
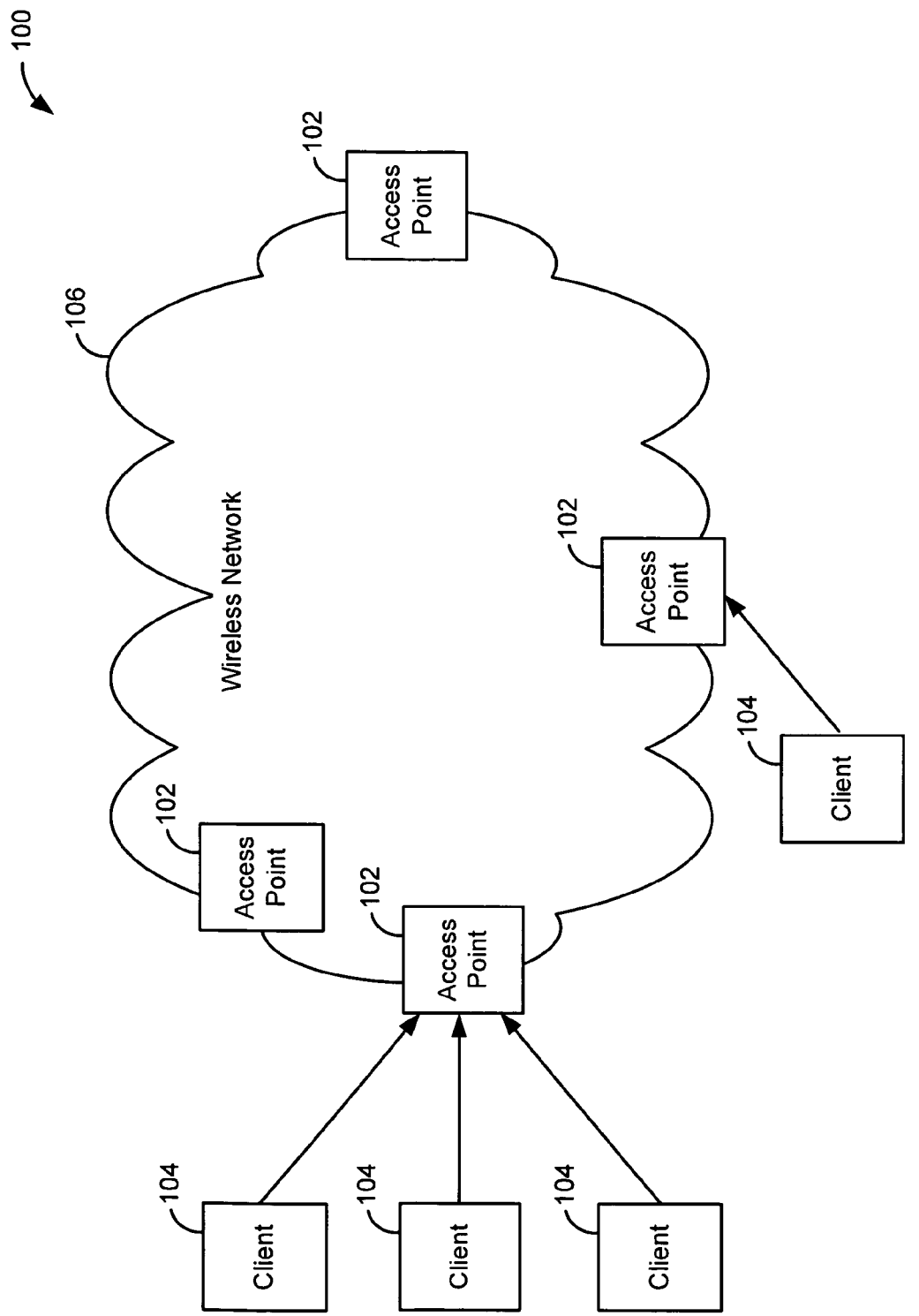
FIG. 1 depicts a system for providing security protection according to one embodiment of the present invention.

FIG. 1 depicts a system 100 for providing security protection according to one embodiment of the present invention. As shown, access points 102, client 104, and network 106 are provided. It will be understood that any number of the components shown in system 100 may be provided. Additional components may be used. Components can be modified from those shown in FIG. 1.

Client 104 may be any computing device configured to communicate with access points 102. For example, clients 104 may include wireless devices, such as laptop computers, cellular telephones, personal digital assistants (PDAs), Blackberry™ devices, pocket PCs, pagers, etc. Clients 104 can access resources on network 106 through access point 102.

Clients 104 may be classified as valid clients or unauthorized clients. For example, a valid client may be any client that is authorized to access network 106. An unauthorized client 104 may be any client where it is determined that it should not be allowed to access network 106. For example, clients 104 that may be determined to be unauthorized include persons, devices or processes attempting undesired actions such as hackers, worms, viruses, etc. As will be described below, intrusion detection systems (IDSs), intrusion protection systems (IPSs), anomaly detection systems, etc. may be used to detect possible unauthorized clients 104.

Access point 102 may be any access point in which a client 104 communicates with to access network 106. For example, clients 104 may have to log on to access point 102 to access network 106. Access points 102 include wireless gateways, routers, base stations, etc. A person skilled in the art will appreciate different examples of access points 102.

Access points 102 are configured to form network 106. Network 106, in one embodiment, may be a wireless network. However, it will be understood that network 106 is not limited to just a wireless network and may include a wire line network also. For example, a wireless network may be connected to a wire line network.

Network 106 may be any network, such as a wireless local area network (WLAN), wide area network, cellular network, etc. Network 106 includes resources that are accessible through access point 102. The resources may include data servers, such as servers where sensitive company documents are stored, Authentication, Authorization, and Accounting (AAA) servers, DNS servers, HTTP servers, FTP servers, or any other resources for an enterprise (such as a corporate network). It may be undesirable for unauthorized clients to access these resources. Accordingly, embodiments of the present invention provide security protection for the resources of network 106.

In one embodiment, a security event may be determined. A client 104 that caused the security event may then be determined to be suspicious. The suspicious client 104 may be unauthorized to access network 106. However, in some cases, the detection techniques may be a false positive in which suspicious client 104 is actually authorized to access network 106. When a security event is determined, it is desirable that an investigation be done in order to determine whether the suspicious client is an unauthorized client or a valid client.

Embodiments of the present invention thus provide two modes that are used in protecting network 106. The first mode is a normal mode in which access to network 106 is allowed through access points 102. This first mode allows legitimate access to resources of network 106. This mode may be a mode that access points 102 operate in a normal condition (i.e., resource access is allowed).

The second mode is a second level of access. This second level of access may restrict resource usage or access to resources in the network. The second mode allows lesser capability in accessing resources of network 106 than the first mode. For example, the traffic may be slowed down almost to a halt using quality-of-service (QOS) policies such that the suspicious client 104 cannot perform efficiently. Suspicious client 104 may not know it has been detected. For example, suspicious client 104 may feel that it has overloaded the network. This gives an application or a network administrator time to figure out whether suspicious client 104 is a valid client or unauthorized client, and any other desired information, such as where suspicious client 104 is located.

Also, a walled garden may be formed in which suspicious client 104 may only be allowed to access resources within the wall. Thus, this protects network 106 from suspicious client 104. Also, a honeypot may be used. The honeypot is a device set to a lower security that is isolated from network resources. The honeypot may be used to collect information about suspicious client 104.

When a security event is detected, instead of intentionally disconnecting suspicious client 104 that is responsible for the event, access point 102 is changed into the second mode. Changing into the second mode may not alert suspicious client 104 that they have been detected. The second mode is entered and analysis of the suspicious client 104 may be performed. If it is determined that suspicious client 104 is an unauthorized client, then access to network 106 is denied. Further analysis, as described below, may also be performed in order to determine information about the unauthorized client 104. If suspicious client 104 is determined to be a valid client, then suspicious client 104 is allowed onto network 106. Further, access point 102 may be changed back into the first mode after suspicious client 104 is determined to be valid.

Figure 2:
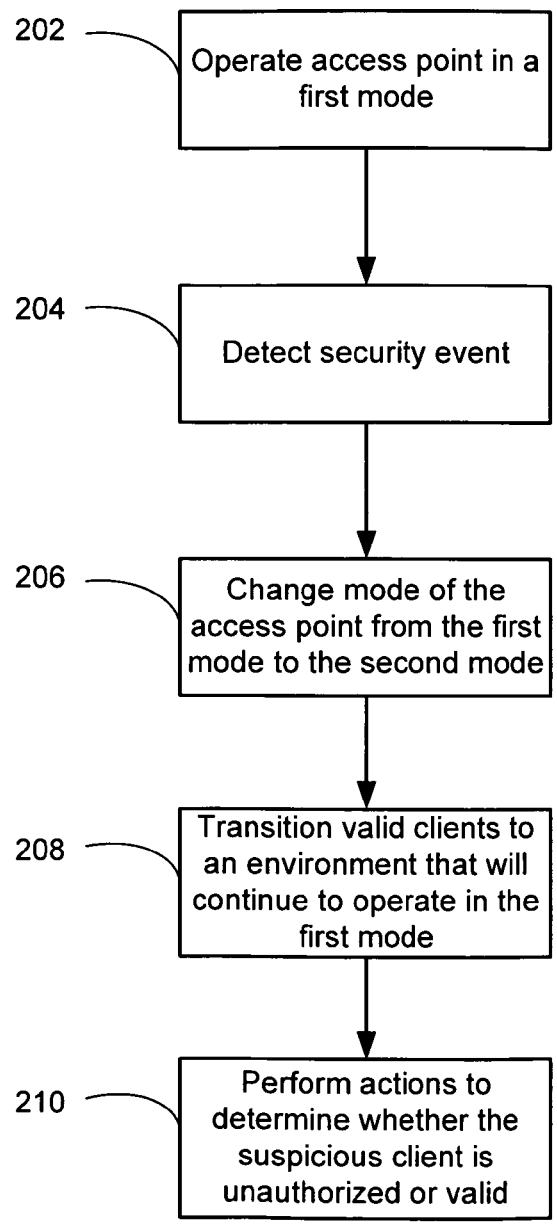
FIG. 2 depicts a simplified flowchart of a method for providing security protection according to one embodiment of the present invention.

FIG. 2 depicts a simplified flowchart 200 of a method for providing security protection according to one embodiment of the present invention. Step 202 operates an access point 102 in a first mode. The first mode is a normal mode in which resources to network 106 are accessible. This is the mode in which clients 104 are allowed to access network 106 in a normal manner. For example, clients 104 may log on to a network using credentials.

Step 204 detects a security event for a suspicious client 104. The security event may be detected through a variety of techniques. For example, access point 102 uses an agent or network monitor (i.e., intrusion detection service (IDS)/intrusion protection service (IPS), anomaly detection, etc.) to identify suspicious activity. Examples of suspicious activity may include excessive pings, too much traffic, several failed attempts at logging on to other network entities, etc.

Step 206 transitions valid clients 104 to an environment that will continue to operate in the first mode. This is so valid clients 104 can continue to be able to access the resources. As will be described in more detail below, valid clients 104 may be switched to a second access point or may be partitioned off from a suspicious client 104.

Step 208 then changes the mode of access point 102 from the first mode to the second mode. The second mode provides restricted access to resources in network 106 or is a network isolation mode.

Step 210 then performs actions that are used to analyze whether the suspicious client 104 is an unauthorized client or valid client. For example, faults may be generated that are visible in a management station and further fed into email, a pager, etc. After this step, details about suspicious client 104 may be used to determine if it is a valid client. For example, a management station may automatically determine whether client 104 is an unauthorized client using a DNS look-up to determine an identity of suspicious client 104. Also, the management station may attempt to figure out the user that logged on using suspicious client 104. The identity of the user may be used to determine if the user is authorized to access the network.

Further, a network administrator may go to access point 102 and determine a switch in which access point 102 is connected and find out the details about suspicious client 104. It may take time for an administrator to get the details to determine if suspicious client 104 is allowed to access network 106. Thus, delaying a suspicious client 104 may be important. Accordingly, by switching into the second mode instead of disconnecting client 104 when a security event is determined, time for analysis is provided. In one embodiment, access is limited during this by rate limiting traffic through access point 104 and/or by walling off suspicious client 104.

If it is determined that suspicious client 104 is an unauthorized client, information about suspicious client 104 may be captured. For example, some traffic being sent to/from client 104 may be captured to find out what suspicious client 104 is doing or any other forensic evidence may be collected. Further details on the type of analysis and techniques used to gather information will be described in more detail below.

Figure 3:
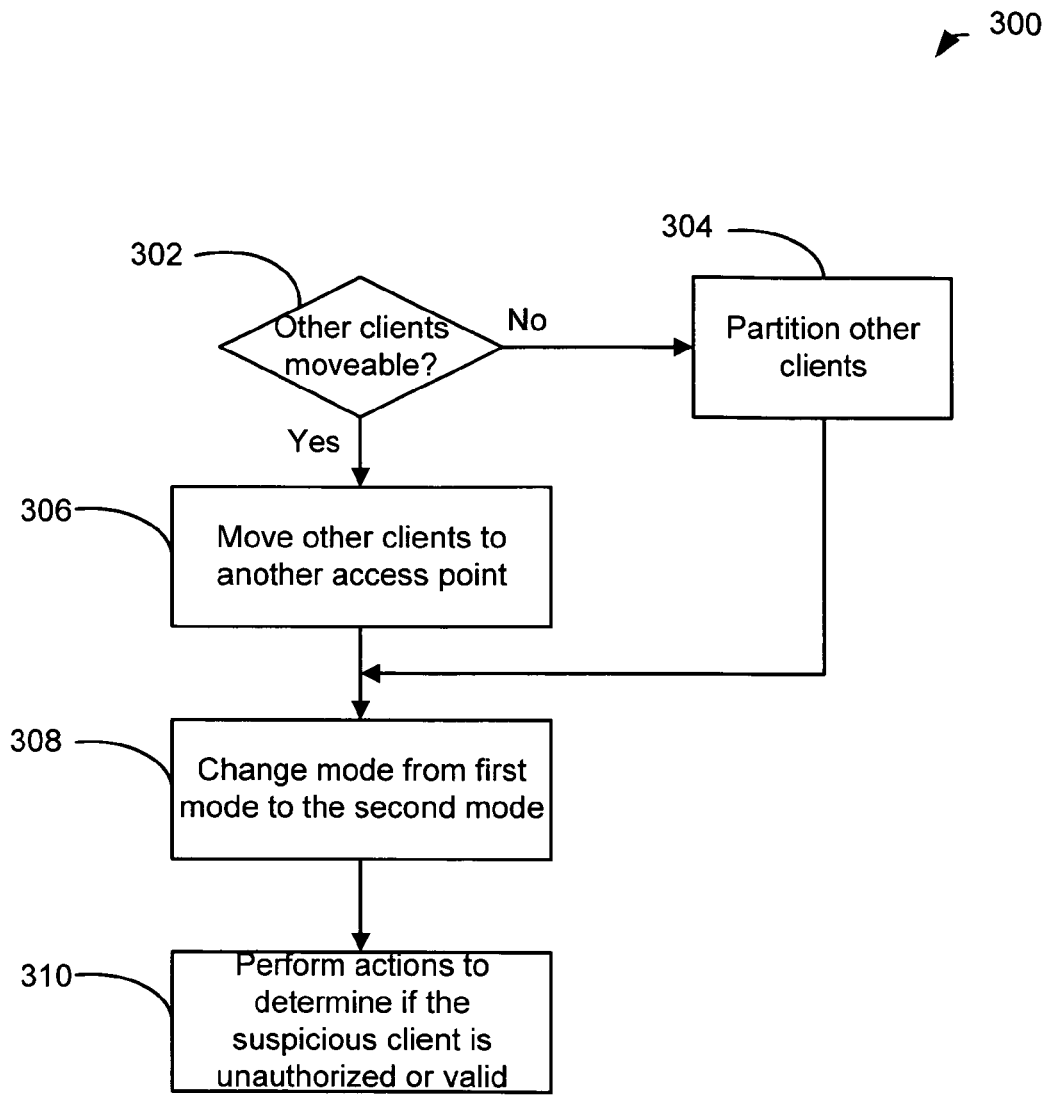
FIG. 3 depicts simplified flowchart of a method for quarantining a suspicious client according to one embodiment of the present invention.

FIG. 3 depicts simplified flowchart 300 of a method for quarantining a suspicious client 104 according to one embodiment of the present invention. In this method, a suspicious client 104 is not moved from an access point 102 that suspicious client 104 attempted to log on to. In another embodiment, the suspicious client 104 may be moved to another device in which the analysis may be performed. This process will be described in more detail below.

The method assumes that access point 102 is operating in the first mode and a security event is detected. When a security event is detected, step 302 determines if clients other than the suspicious client 104 can be moved to another access point 102. In one embodiment, it is desirable to keep a suspicious client 104 on the same access point 102. This may make it harder for suspicious client 104 to determine that it has been detected as a suspicious client. In some cases, if suspicious client 104 knows it has been detected, it may disconnect from access point 102 and not allow any further information to be collected.

If the other clients 104 cannot be moved to another access point 102, then step 304 performs a partitioning in order to differentiate the other clients from suspicious client 104. The partitioning may include using identifiers for the other clients. For example, the identifiers may be associated with communications from the other clients 104. Thus, communications with these identifiers may be allowed on network 106. However, an identifier for suspicious client 104 may be added to communications and those communications are not passed to network 106. The process then proceeds to step 310.

If the other clients can be moved to another access point 102, step 306 moves the other clients 104 to another access point 102. Moving other users to another access point 102 also allows access point 102 to devote more resources in analyzing and identifying suspicious client 104. Also, suspicious client 104 cannot detect the moving of other clients 104 to another access point 102 and thus still may not determine that it has been detected.

Step 308 changes the mode of access point 102 from the first mode to the second mode. Step 310 performs actions in order to determine if suspicious client 104 is an unauthorized client or a valid client.

Figure 4:
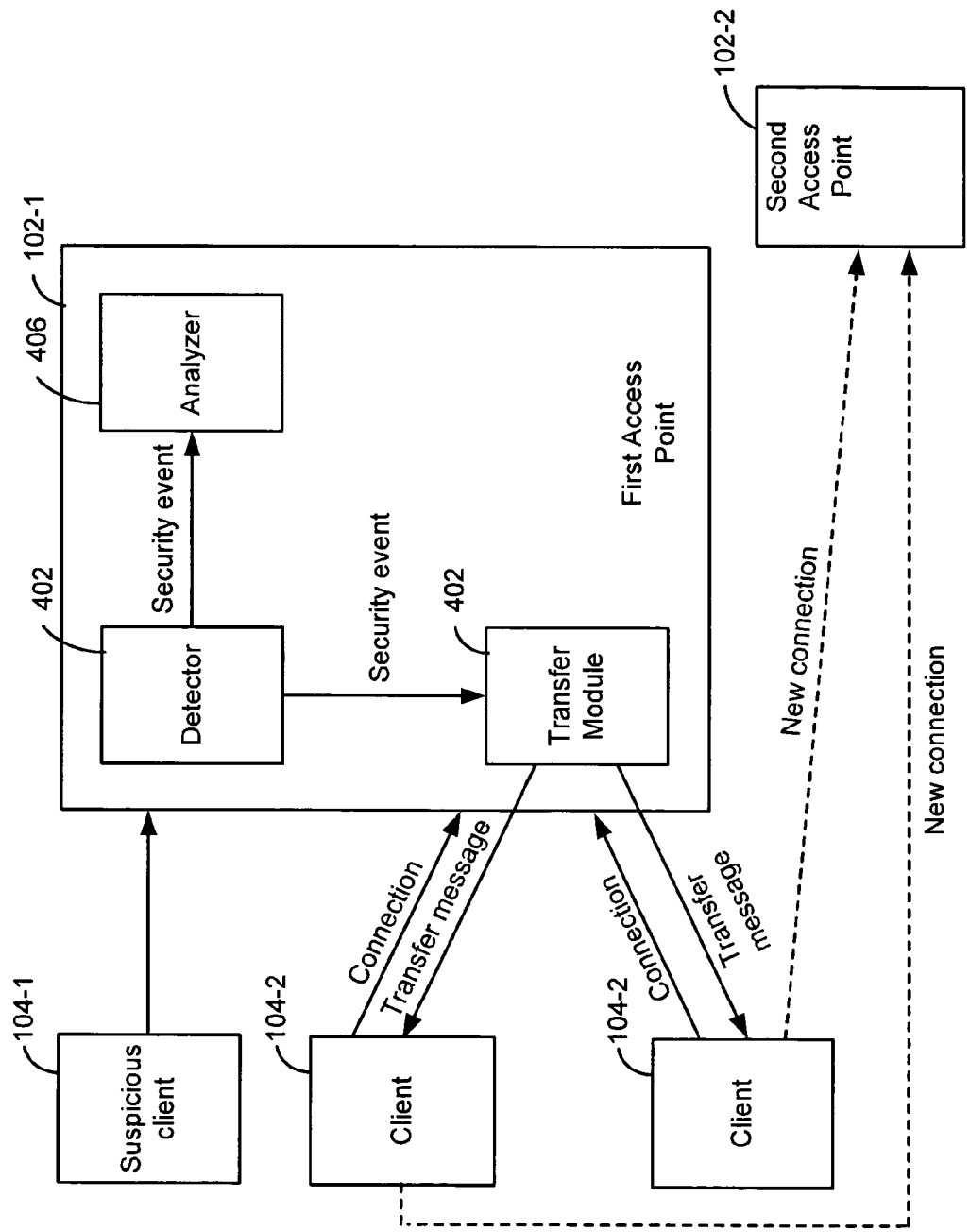
FIG. 4 depicts the system for implementing the method described in FIG. 3 according to one embodiment of the present invention.

FIG. 4 depicts the system 400 for implementing the method described in FIG. 3 according to one embodiment of the present invention. As shown, a suspicious client 104-1 and two other valid clients 104-2 are provided. Suspicious client 104-1 and clients 104-2 are communicating with access point 102.

Access point 102 includes a detector 402, transfer module 404, and an analyzer 406. These may be implemented in software, hardware, or any combination thereof.

Detector 402 is configured to detect a security event. For example, detector 402 may include an intrusion detection system that sends alerts when certain security events occur. When a security event is determined, transfer module 404 is configured to communicate with other clients 104-2 to facilitate moving them to another access point 102-2. A person skilled in the art will appreciate how clients 104-2 may be moved to access point 102-2. The moving of clients 104-2 is performed without suspicious client 104-1 detecting the transfer.

Analyzer 406 is then configured to perform actions in order to determine if client 104-1 is an unauthorized client or an authorized user.

FIG. 4 shows a suspicious client 104 that is kept on an access point 102. In another embodiment, a suspicious client 104 may be rerouted to another device. For example, a walled garden or another access point 102 may be used to analyze suspicious client 104-1. In this case, when a security event is detected, suspicious client 104-1 is rerouted to a device that is operating in the second mode as described above. The device may be an access point 102 running in the second mode, such as a honeypot running in the second mode. The method of performing actions to analyze suspicious client 104-1 is then performed as described above.

The following is an example of actions that may be performed when a security event is received. As described above, the actions may be performed in order to determine if a suspicious client is unauthorized or valid. Access point 102 may move all other non-offending clients 104 to different access points 102. Load balancing may be used in order to balance out the load given to other access points 102.

Traffic is then slowed down on access point 102. An example is when suspicious client 104 is transferring a large file internally using ftp from a data server to a lab. Too much traffic might set off alarms but this may be valid traffic. QOS policies may be applied to slow the traffic down, which might allow the network administrator enough time to analyze whether the traffic is valid and react accordingly. For example, access point 102 may be changed back to the first mode.

Access point 102 then captures/monitors debugging traffic for forensic logging analysis. The information can be forwarded or tunneled to an IDS/IPS/inspection engine or application for additional analysis.

Access point 102 may also simulate fake traffic in order to confuse suspicious client 104 if suspicious client 104 is doing passive snooping. This may keep suspicious client 104 on access point 102.

Further, access point 102 and neighboring access points 102 may enter into a "triangulation" mode that attempts to approximate the physical location of suspicious client 104. This may be performed using radio frequency (RF) power triangulation techniques. The approximate physical location would then be reported to a network administrator, stored, or identified on a network map/diagram.

If suspicious client 104 and its traffic are determined to be unauthorized (i.e., actively detrimental to network 106, other clients or services), access point 102 may eventually send a disconnect signal to suspicious client 104. Otherwise, access point 102 may maintain a connection and then stall suspicious client 104 until it can be physically located. If suspicious client 104 is determined to be a valid client, then access point 102 can go back to the first mode.

Embodiments of the present invention provide many advantages. For example, security forensics and the probability of identifying, locating, and stopping a suspicious client 104, intruder, or attack is improved. This is improved by keeping a suspicious client 104 on an access point 102 while analysis is performed in a manner that limits the ability of a client 104 to determine that it has been detected.

Additionally, embodiments of the present invention can limit false positives and false negatives by handling security events in a managed manner. For example, false positives may be managed by not immediately disconnecting from a suspicious client 104. Rather, analysis is performed in the second mode in order to determine if the suspicious client is a non-authorized user or authorized user.

Also, embodiments of the present invention may be implemented on a centralized architecture or on an autonomous architectures.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

We claim:

1. A method comprising:
operating an access point in a first mode, the first mode allowing a first level of access to a network;
detecting a security event for a suspicious client while operating the access point in the first mode;
transitioning one or more valid clients other than the suspicious client to an environment operating in the first mode, the transitioned one or more valid clients still having access to the network; and
changing from the first mode of operation to a second mode of operation in response to detecting the security event, the second mode allowing a second level of access to the network, the second level of access being more restrictive in allowing access to the network than the first level of access.

2. The method of claim 1, further comprising performing one or more actions to determine information about the suspicious client.

3. The method of claim 2, further comprising analyzing the information to determine if the suspicious client is an unauthorized client or a valid client.

4. The method of claim 3, further comprising changing from the second mode to the first mode if it is determined that the suspicious client is a valid client.

5. The method of claim 1, further comprising performing a suspicious client action after changing from the first mode to the second mode.

6. The method of claim 5, wherein the suspicious client action comprises disconnecting the suspicious client from the access point.

7. The method of claim 5, wherein the suspicious client action comprises gathering information about the suspicious client.

8. The method of claim 5, wherein the suspicious client action comprises slowing down traffic for the suspicious client or faking traffic.

9. The method of claim 5, wherein the suspicious client action comprises determining a physical location for the suspicious client.

10. The method of claim 1, wherein transitioning the one or more valid clients other than the suspicious client comprises switching the one or more valid clients from the access point to a second access point.

11. The method of claim 1, wherein transitioning the one or more valid clients other than the suspicious client comprises partitioning the one or more valid clients from the suspicious client at the access point.

12. The method of claim 1, wherein changing from the first mode to the second mode comprises changing the access point from the first mode to the second mode.

13. The method of claim 1, wherein changing from the first mode to the second mode comprises transferring the suspicious client to a second device configured to operate in the second mode of operation in response to detecting the security event.

14. The method of claim 1, wherein the first mode is a normal mode of operation that allows access to resources of the network.

15. The method of claim 1, wherein the network comprises a wide local area network (WLAN).

16. An access point comprising:
   logic configured to operate the access point in a first mode allowing a first level of access to a network;
   a security event detector configured to detect a security event for a suspicious client while operating the access point in the first mode;
   logic configured to transition one or more valid clients other than the suspicious client to an environment operating in the first mode, the transitioned one or more clients still having access to the network; and
   logic configured to change from the first mode of operation to a second mode of operation in response to detecting the security event, the second mode allowing a second level of access to the network, wherein the second level is more restrictive in allowing access to the network than the first mode.

17. The access point of claim 16, further comprising logic configured to perform one or more actions to determine information about the suspicious client.

18. The access point of claim 17, further comprising logic configured to analyze the information to determine if the suspicious client is an unauthorized client or a valid client.

19. The access point of claim 18, further comprising logic configured to change from the second mode to the first mode if it is determined that the suspicious client is a valid client.

20. The access point of claim 16, further comprising logic configured to perform a suspicious client action after changing from the first mode to the second mode.

21. The access point of claim 20, wherein the suspicious client action comprises disconnecting the suspicious client from the access point.

22. The access point of claim 20, wherein the suspicious client action comprises gathering information about the suspicious client.

23. The access point of claim 20, wherein the suspicious client action comprises slowing down traffic for the suspicious client or faking traffic.

24. The access point of claim 20, wherein the suspicious client action comprises determining a physical location for the suspicious client.

25. The access point of claim 20, wherein the suspicious client action comprises disconnecting the suspicious client from the access point.

26. The access point of claim 16, wherein logic configured to transition the one or more valid clients other than the suspicious client comprises logic configured to switch the one or more valid clients from the access point to a second access point.

27. The access point of claim 16, wherein logic configured to transition the one or more valid clients other than the suspicious client comprises logic configured to partition the one or more valid clients from the suspicious client at the access point.

28. The access point of claim 16, wherein the logic configured to change from the first mode to the second mode comprises changing the access point from the first mode to the second mode.

29. The access point of claim 16, wherein the logic configured to change from the first mode to the second mode comprises transferring the suspicious client to a second device configured to operate in a second mode of operation in response to detecting the security event.

30. The access point of claim 16, wherein the first mode is a normal mode of operation that allows access to resources of the network.

31. The access point of claim 16, wherein the network comprises a wide local area network (WLAN).

32. A system comprising:
   a plurality of access points for the wireless network, wherein an access point is configured to:
      operate in a first mode, the first mode allowing a first level of access to a network;
      detect a security event for a suspicious client in the one or more clients while operating the access point in the first mode;
      transition one or more valid clients other than the suspicious client to an environment operating in the first mode, the transitioned one or more clients still having access to the network; and
      change from the first mode of operation to a second mode of operation in response to detecting the security event, the second mode allowing a second level of access to the network, the second level access being more restrictive than the first level of access.

33. The system of claim 32, wherein the first mode is a normal mode of operation that allows access to resources of the network.

* * * * *